United States Patent
Bogoni et al.

(10) Patent No.: US 7,925,131 B2
(45) Date of Patent: Apr. 12, 2011

(54) OPTICAL LOGIC GATE

(75) Inventors: Antonella Bogoni, Mantova (IT); Paolo Ghelfi, Goito (IT); Luca Poti, Pisa (IT); Filippo Ponzini, Bedonia (IT)

(73) Assignee: Ericsson AB, Stockholm (SE)

( * ) Notice: Subject to any disclaimer, the term of this patent is extended or adjusted under 35 U.S.C. 154(b) by 576 days.

(21) Appl. No.: 11/570,985

(22) PCT Filed: May 27, 2005

(86) PCT No.: PCT/EP2005/052437
§ 371 (c)(1),
(2), (4) Date: Dec. 20, 2007

(87) PCT Pub. No.: WO2006/000508
PCT Pub. Date: Jan. 5, 2006

(65) Prior Publication Data
US 2008/0273831 A1    Nov. 6, 2008

(30) Foreign Application Priority Data
Jun. 24, 2004   (IT) ............................ MI2004A1286

(51) Int. Cl.
G02B 6/26    (2006.01)
(52) U.S. Cl. .................... 385/122; 385/27; 359/108
(58) Field of Classification Search .................. None
See application file for complete search history.

(56) References Cited

U.S. PATENT DOCUMENTS

| 4,262,992 A | * | 4/1981 | Berthold ........................ 385/15 |
| 4,382,660 A | | 5/1983 | Pratt, Jr. et al. |
| 4,632,518 A | | 12/1986 | Jensen et al. |
| 5,078,464 A | | 1/1992 | Islam |
| 5,146,517 A | * | 9/1992 | Avramopoulos et al. ....... 385/39 |
| 5,414,789 A | * | 5/1995 | Tamil et al. ................... 385/122 |
| 5,473,712 A | | 12/1995 | Blow et al. |
| 5,600,479 A | * | 2/1997 | Evans .......................... 359/237 |
| 2002/0154350 A1 | * | 10/2002 | Johnson et al. .............. 359/108 |

(Continued)

FOREIGN PATENT DOCUMENTS
EP    0265233    4/1988
(Continued)

OTHER PUBLICATIONS

A. Bogoni et al. Regenerative and reconfigurable all-optical logic gates for ultra-fast applications. Electronics Letters 41:7, Mar. 2005.*

(Continued)

Primary Examiner — Mike Stahl
(74) Attorney, Agent, or Firm — Coats & Bennett, P.L.L.C.

(57) ABSTRACT

An optical logic gate (10) comprises: first and second optical inputs (11, 12) for receiving respective optical signals (A, B) and an optical output (15) for outputting an optical signal ($P_{out}$) which represents the result of applying a required logic function. The logic gate is characterized by optical combining means (13) for combining the optical signals to produce a corresponding combination signal whose power ($P_i$) is the combination of the powers ($P_A$, $P_B$) of the optical signals and non-linear optical means (14) for receiving the combination signal ($P_i$) and emitting the optical output signal ($P_{out}$) the logic function depending on the characteristic of the non-linear optical means wherein the characteristic is selected such that the power of the output signal is correlated to the power of the combination signal by the selected logic function.

13 Claims, 4 Drawing Sheets

U.S. PATENT DOCUMENTS

| | | |
|---|---|---|
| 2003/0002797 A1* | 1/2003 | Chu et al. ............... 385/39 |
| 2004/0184750 A1* | 9/2004 | Shahar et al. ............ 385/122 |
| 2005/0152429 A1* | 7/2005 | Scherer .................. 372/92 |
| 2008/0129564 A1* | 6/2008 | Kitayama et al. .......... 341/137 |

FOREIGN PATENT DOCUMENTS

| | | |
|---|---|---|
| EP | 0375346 | 6/1990 |
| WO | WO 2005/047970 A1 * | 5/2005 |

OTHER PUBLICATIONS

H. Ichikawa et al. An all optical programmable logic gate. IEE Colloquium on Optics in Computing, 16/1-4, Nov. 1988.*

Y. Wang et al. All-fiber logical devices based on the nonlinear directional coupler. IEEE Photonics Technology Letters 11:1:72-74, Jan. 1999.*

Y. Miyoshi et al. Ultrafast all-optical logic gate using a nonlinear optical loop mirror based multi-periodic transfer function. Optics Express 16:4:2570-2577, Feb. 2008.*

N.S. Patel et al. 40-Gbit/s cascadable all-optical logic with an ultrafast nonlinear interferometer. Optics Letters, 21:18:1466-1468, Sep. 1996.*

Cao, X D et al. "Experimental Cascaded Operation of Low-Birefringence Nonlinear-Optical Loop Mirrors." Optics Letters, Optical Society of America, Washington, US, vol. 21, No. 16, Aug. 15, 1996, pp. 1211-1213, XP000623766, ISSN: 0146-9592.

Jinno, M et al. "Ultrafast All-Optical Logic Operations in a Nonlinear Sagnac Interferometer with Two Control Beams." Optics Letters, Optical Society of America, Washington, US, vol. 16, No. 4, Feb. 15, 1991, pp. 220-222, SP000176134, ISSN: 0146-9592.

* cited by examiner

OPTICAL LOGIC GATE

The present invention relates to optical logic gates and more particularly all-optical logic gates which are re-configurable (in terms of logic function) and which are also advantageously regenerative. In the context of the present application all-optical means that the logic operation is carried out in the optical domain without the need for conversion to a corresponding electrical quantity.

In the field of optical fibre communication the ability to perform ultra fast logic operations on optical signals without conversion back to an electrical signal is ever more desirable.

For example, broadband packet switched networks require ultra-fast all-optical signal processing in order to perform high-speed routing functions such as synchronization of packets, address recognition, and content resolution in real time. The use of all-optical digital logic gates appears to be indispensable for carrying out such functionality. Logic gates should have high contrast ratio between 'on' and 'off' states in order to allow their cascadability and to provide low bit-error rates, and they should also have very fast response time in order to allow real-time all-optical processing.

In the literature, a few examples of all-optical logic gates have been presented exploiting non-linear effects in: (i) semiconductor devices, (ii) optical fibre and (iii) waveguide devices. However, in the first case the response time of semiconductors limits the maximum signal bit rate, whilst in the second case the performance obtainable with commercial fibres is insufficient and special high-cost fibres are necessary which are difficult to manufacture and unsuited to commercial use. Finally, logic gates based on waveguide devices are still in their early stages of development and need further investigation from the viewpoint both of technology and of operation before being commercially viable.

The general purpose of the present invention is to remedy the above-mentioned shortcomings by making available all-optical logic gates that are simple to realize, are relatively low in cost and ideally are capable of ultra-fast operation. Another purpose of the invention is to make available simple and economical all-optical logic gates which are re-configurable, that is the logic function they provide can be readily reconfigured. Moreover a further purpose is to provide a gate which is preferably regenerative, that is they regenerate the logic levels which may have been impaired due to dispersion during transmission over an optical fibre.

In accordance with the invention an optical logic gate comprises: first and second optical inputs for receiving respective optical signals and an optical output for outputting an optical signal which represents the result of applying a required logic function, the gate being characterised by optical combining means for combining the optical signals to produce a corresponding combination signal whose power is the combination of the powers of the optical signals and non-linear optical means for receiving the combination signal and emitting the optical output signal the logic function depending on the characteristic of the non-linear optical means wherein the characteristic is selected such that the power of the output signal is correlated to the power of the combination signal by the selected logic function.

Advantageously, the optical combining means performs the summation of the powers of the signals and the characteristic is such that the power of the output signal is correlated to the sum of the powers of the input signals. Preferably, the optical combining means comprises a Polarization Beam Combiner (PBC) and the optical signals are advantageously combined with orthogonal states of polarization to eliminate instability due to phase interference.

In a particularly preferred embodiment the non-linear optical means comprise a non-linear optical loop mirror NOLM. A particular advantage of a NOLM is that since it is based on an optical fibre its response time is extremely fast enabling logic gates to be implemented that can operate at very high bit rates, 160 Gbit/s and higher. In a first arrangement the NOLM is of a type based on Self Phase Modulation (SPM) in which the combination signal is split such as to propagate around the fibre loop in counter directions. Such an arrangement enables AND, OR and XOR logic gates to be realised. Alternatively, the NOLM is of a type based on Cross Phase Modulation (XPM) in which the combination signal constitutes an optical pump and further comprising an optical probe signal as an input signal. Such an arrangement enables NOR and EQUIVALENCE (EQ) logic gates to be realised. Advantageously in the case of the latter arrangement, the gate further comprises an optical pedestal suppressor connected to the output of the XPM NOLM. Conveniently, the optical pedestal suppressor comprises a SPM NOLM.

In a particularly preferred implantation the gate further comprises a polarization controller in the fibre loop of the non-linear optical loop mirror for changing the characteristic of the NOLM to select a required logic function. Such arrangement enables realization of a re-configurable optical logic gate.

To avoid Four Wave Mixing (FWM) in the fibre loop of the NOLM and walk-off impairments, the optical signals advantageously have the same carrier wavelength.

Preferably, a respective adjustable optical attenuator is provided between the optical inputs and the optical combining means to maintain the power levels of the optical signals at desired levels.

Since the characteristic of the NOLM is dependent on the peak power of the combination signal, the gate advantageously further comprises an optical amplifier, preferably an Erbium Doped Fibre Amplifier (EDFA) for amplifying the combination signal before it is input into the NOLM.

In order that the invention can be better understood a logic gate in accordance with the invention will now be described, by way of example only, with reference to the accompanying drawings in which:

FIG. 2 is a graph of ideal characteristics of a non-linear block used in the present invention to realize logic functions NAND, EQ, NOR, XOR, OR and AND;

Figure 1:
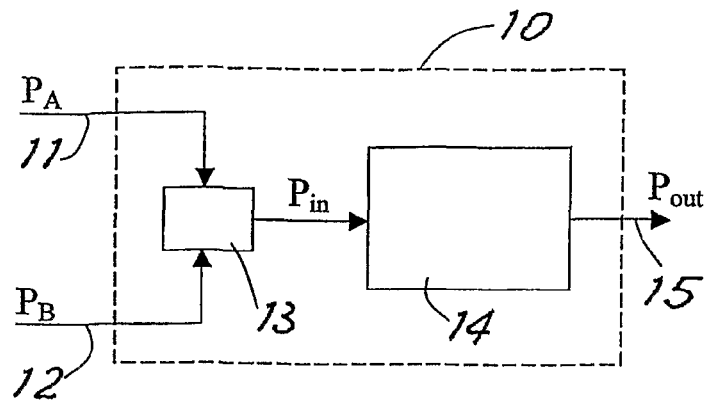
FIG. 1 is a block schematic of a logic gate in accordance with the invention.

Referring to FIG. 1 there is shown a block schematic of an optical logic gate 10 in accordance with the principles of the present invention. The logic gate 10 comprises two optical inputs 11 and 12 to which are applied digital optical signals A, B on which the logic operation is to be performed. The two optical signals A and B are added by optical combining (power summation) means 13 to give a optical signal of power $P_{in}=P_A+P_B$ where $P_A$ and $P_B$ are the powers the input signals A and B respectively. The power $P_{in}$ output from the summation means 13 is applied to a non-linear optical device 14 having an appropriate non-linear characteristic and whose optical output 15 is the output of the logic gate.

Essentially, when the input power $P_{in}$ to the non-linear block is the summation of the powers of two digital signals A and B, the power output $P_{out}$ from the non-linear block can represent a logic function of A and B.

The ideal non-linear characteristic of the non-linear block 14 depends on the logic gate to be implemented. In fact, the output power must be high (or low) for a corresponding input power depending on the desired logic function, for the cases of both A and B at high level (case 11) or low level (case 00) or when one is high and the other is low (cases 10 and 01). It is to be noted that if A and B have the same peak power, the cases 01 and 10 are undistinguishable and the pump power correspondence is half that of case 11.

Figure 2:
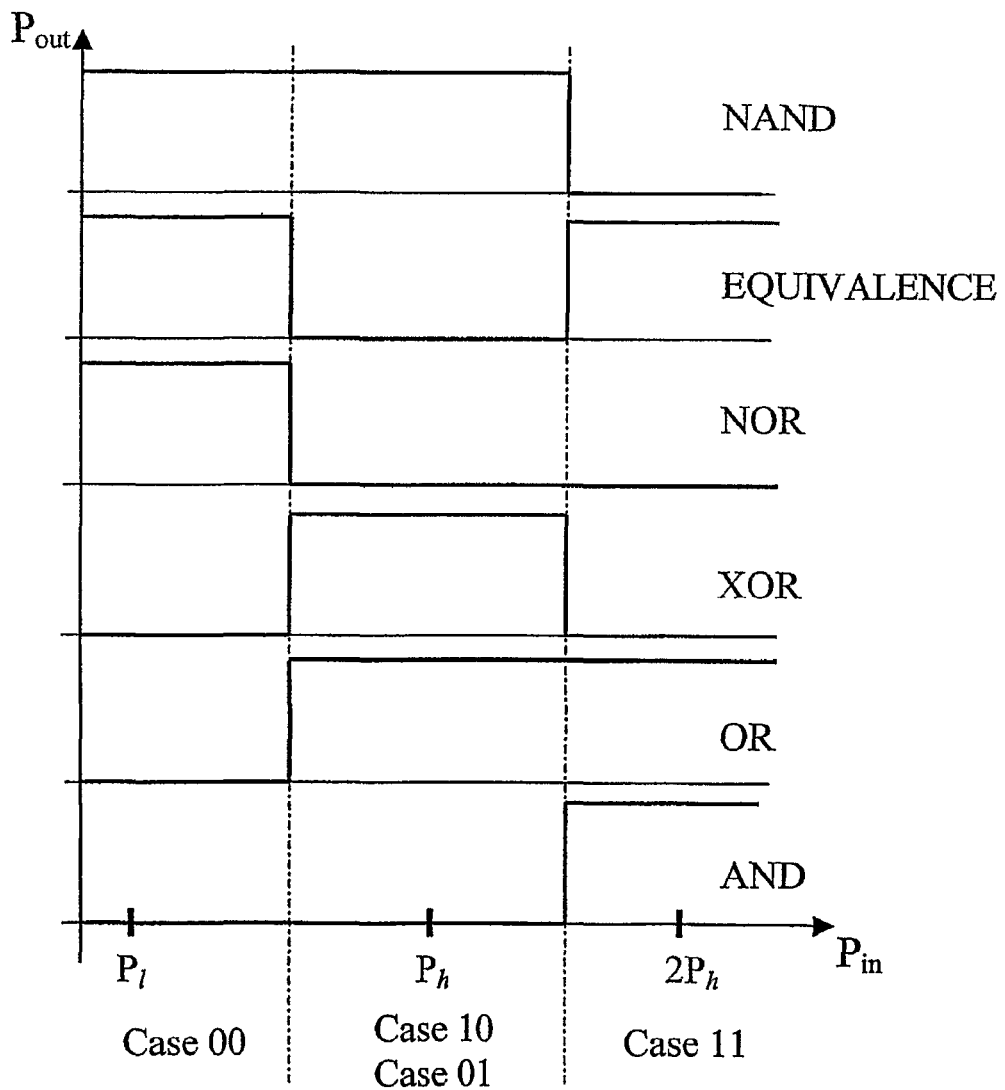

FIG. 2 shows the ideal characteristics ($P_{out}$ versus $P_{in}$) of a non-linear block to realize logic functions NAND, EQ (EQUIVALENCE), NOR, XOR (NON EQUIVALENCE or NEQ), OR and AND. In FIG. 2 the abscissa represents the summation $P_{in}$ of the powers of the two digital optical signals A and B at low level $P=P_l$ (both signals A and B at low level), at high level $P_{in}=P_h$ (an A or B signal at low level and the other at high level) and at high level $P_{in}=2P_h$ (both the A and B signals at high level). For example, as may be seen from the figure, for an AND gate function the output power is low if either or both input signals are low (i.e. $P_{in}=P_l$ case 00 or $P_{in}=P_h$, cases 01 and 10) and high when both inputs are high ($P_{in}=2*P_h$ case 11). It is to be noted that the NOT function is obtained by considering the NOR gate with A=B.

The underlying principle of the present invention is to utilize a single non-linear element which is capable of exhibiting a characteristic similar to that described in FIG. 2 for the purpose of implementing the corresponding logic gate. The properties (logic function) of the implemented logic gates depend on the characteristics of the non-linear block 14.

In a preferred embodiment, a known Non-linear Optical Loop Mirror (NOLM) is used as the non-linear block.

As is known, NOLMs can be realized with two different configurations. In a first configuration in which the input signal is split such as to counter-propagate around the loop, one of the two counter-propagating halves of the input signal can experience a non-linear phase shift induced by Self Phase Modulation (SPM) utilizing a power unbalancing of the loop (the input signal acts as an optical pump). In a second configuration in which the input signal propagates in one direction around the loop and is pumped by a counter-propagating pump generated externally of the loop, the input signal can experience a non-linear phase shift induced by Cross Phase Modulation (XPM).

If the NOLM is constructed using a non-polarization maintaining (non-PM) optical fibre, a polarization controller (PC) can be included within the loop to change the non-linear characteristics of the NOLM by adding a constant phase shift to create constructive or destructive interference at the output for different pump power levels.

For both NOLM configurations, if we consider signal inducing the phase shift as the summation of two different digital signals A and B, the output power of the NOLMs can represent a logic function of A and B. In fact, by simply changing the setting of the polarization controller the output power can be high (or low) for a pump power corresponding to the case of A and B both at high level (case 11) or both low level (case 00) or when one is high and the other low (cases 10 and 01). It is to be noted that if A and B have the same peak power, the cases 01 and 10 are undistinguishable and the corresponding pump power is half that of case 11. As a result it is possible, by appropriate control of the polarization controller, to produce a non-linear corresponding to each of the cases shown in FIG. 2.

Figure 3:
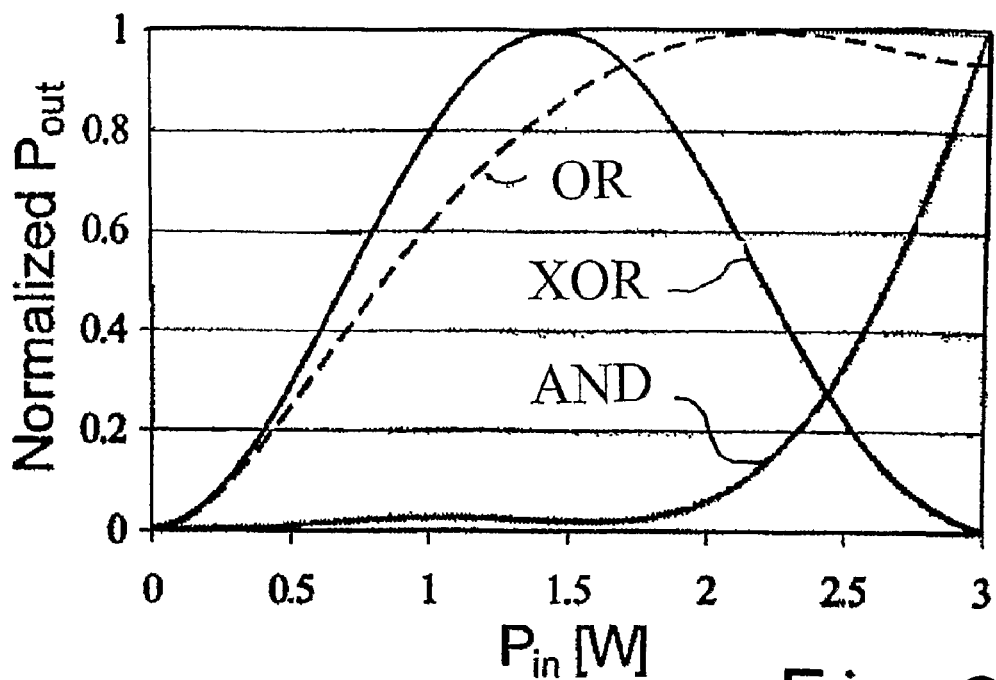
FIGS. 3 and 4 are plots of non-linear characteristics (Normalised output power $P_{out}$ versus input power $P_{in}$) of a Non-linear Optical Loop Mirror (NOLM) based respectively on Self Phase Modulation (SPM) and Cross Phase Modulation (XPM)
Figure 5:
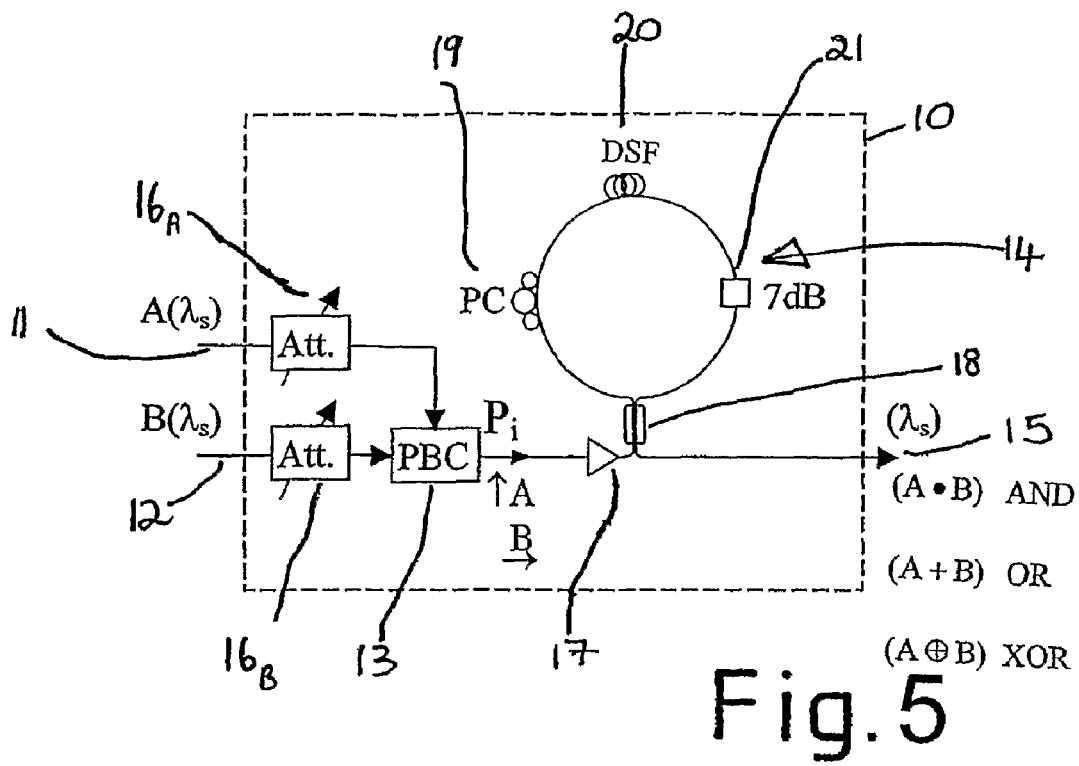
FIG. 5 is an arrangement for AND, OR and XOR gates in accordance with the invention based on SPM.

Referring to FIG. 3 there is shown measured plots of non-linear characteristics (Normalised output power $P_{out}$ versus input power $P_{in}$) of a Non-linear Optical Loop Mirror (NOLM) based on Self Phase Modulation (SPM), as illustrated in FIG. 5, for implementing AND, OR and XOR logic functions by appropriately adjusting the polarization controller CC) in the loop. The NOLM comprises 1 km of non-polarization maintaining Dispersion Shifted Fibre (DSF) with a lumped loss of 5 dB into the loop. The DSF has a non-linear coefficient of 2 $km^{-1}watt^{-1}$. The plots are for an input signal power $P_{in}$ which is ramped from 0 to 3 W. For each characteristic the output power of the NOLM has been normalized to its maximum value.

If the input signal to the NOLM (abscissa in FIG. 3) is considered as the sum of two digital signals A and B, both with the low level equal to 0 W and the high level at 1.5 W, the characteristics in FIG. 3 represent the logic functions AND, OR or XOR of the signals A and B. For example, in the AND gate the NOLM output power is low for $P_{in}=0$ (case 00) and $P_{in}=1.5$ W (cases 01 and 10) and high for $P_{in}3$ W (case 11).

Figure 4:
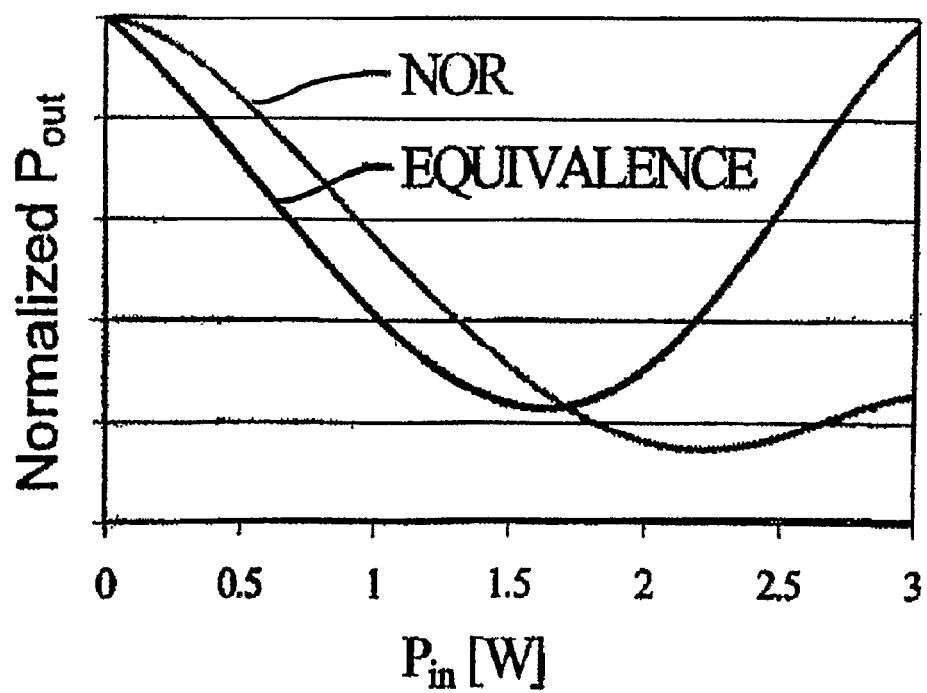
Figure 6:
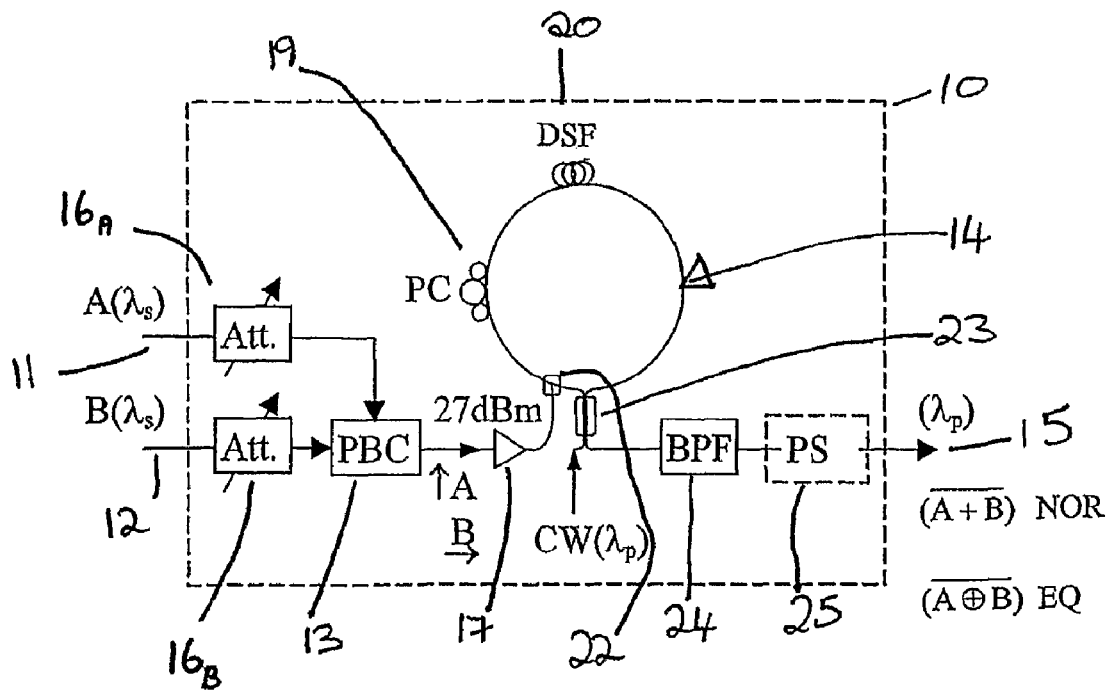
FIG. 6 is an arrangement for NOR and EQ gates in accordance with the invention based on XPM.

Similarly, FIG. 4 shows the non-linear characteristics for a NOLM which is based on XPM, as illustrated in FIG. 6, for implementing NOR and EQUIVALENCE logic functions. The NOLM comprises 1 km of non-PM DSF and the output power is normalised. Implementation using a non-PM fibre allows realization of inverting functions. In this case the NOLM input signal is a CW probe signal while the ramp signal is used as a pump signal inserted in the loop to induce the XPM in the probe signal. Considering the same power levels as in the preceding case, FIG. 4 illustrates the logic functions EQUIVALENCE and NOR between the signals A and B.

From FIGS. 3 and 4 it is also possible to determine the on-off contrast ratio for each of the various logic functions. In the best cases (AND, XOR, OR) the contrast ratio is better than 20 dB whilst in the worst case (EQUIVALENCE) the ratio is higher than 6.5 dB due to the pedestal of the output signal. In the case of the latter the contrast ratio can be further improved by adding a SPM based NOLM in cascade as clarified below.

FIG. 5 shows a re-configurable logic gate in accordance with the invention in which the non-linear element 14 comprises a NOLM which is based on SPM. The logic gate is re-configurable and capable of operation as AND (A·B), OR (A+B) and XOR (A⊕B) logic gates depending on the setting of the polarization controller 19.

FIG. 6 shows a re-configurable logic gate in accordance with the invention in which the non-linear element 14 comprises a NOLM which is based on XPM. The logic gate is re-configurable and capable of operation as EQUIVALENCE ($\overline{A \oplus B}$) or NOR ($\overline{A+B}$) gates depending on the setting of the polarization controller 19.

In both configurations, the optical input signals A and B are advantageously applied to a respective variable attenuation optical attenuator (Att.) $16_A$, $16_B$ to attenuate their power level to an appropriate level before being optically combined by the optical combining means 13a which advantageously comprises a Polarization Beam Combiner (PBC). The variable optical attenuators are for ensuring the same power levels of the signals for corresponding logic states and can accordingly be omitted if the power of the input signals is guaranteed. The combined signal output from the PBC constitutes the input signal to the non-linear device 14. Each of the signals A and B have the same carrier wavelength ($\lambda_s$) to avoid Four Wave Mixing (FWM) in the DSF 20 of the NOLM and walk-off impairments. The signals A and B are combined with orthogonal polarizations in order to eliminate instability due to phase interference.

Referring to FIG. 5 there is shown an optical logic gate in accordance with the invention in which the non-linear block 14 comprises a NOLM based on SPM. Since NOLM are well known and their implementation will accordingly be readily derivable to those skilled in the art only a brief description of the NOLM will be given. The NOLM in FIG. 5 comprises an input optical amplifier (advantageously a known EDFA amplifier) 17 and a 50:50 optical coupler/splitter 18 for splitting and coupling the input signal such that respective halves of the signal counter propagate around the fibre loop 20. The 50:50 coupler 18 advantageously comprises a fused fibre coupler and the fibre loop a 1 km length of dispersion shifted fibre DSF (non-linear coefficient 2 $km^{-1}watt^{-1}$). Within the Figure the part of the input signal which propagates in a counter clockwise direction constitutes an optical pump which interacts with the other part of the signal through a process of Self Phase Modulation. The last port of the coupler/splitter 18 is used to extract the signal propagating in a clockwise once it has passed around the fibre loop and undergone SPM and constitutes the output signal 15 of the non-linear block. Within the fibre loop a polarization controller PC 19 and a 7 dB attenuator 21. The polarization controller 19 is used to set the logic function of the gate i.e. AND (A·B), OR (A+B) and XOR (A⊕B). The attenuator 21 ensures a power imbalance between the respective halves of the combination signal, that is counter-clockwise propagating pump and the clockwise propagating input signal.

Referring to FIG. 6 there is shown an optical logic gate in accordance with the invention in which the non-linear block 14 comprises a NOLM based on XPM. The gate is re-configurable as EQUIVALENCE ($\overline{A \oplus B}$) and NOR ($\overline{A+B}$) logic functions dependent on the polarization controller. The same reference numerals are used for like components to the embodiment of FIG. 5. Within this embodiment the input signal, which constitutes an optical pump, is coupled into the fibre loop to propagate in a clockwise direction by an optical coupler 22. The coupler 22 advantageously comprises a fused fibre coupler. A continuous wave (CW) optical probe signal of wavelength $\lambda_p$ is coupled into the fibre loop by a 50:50 coupler/splitter 23. Again the coupler/splitter advantageously comprises a fused fibre coupler and respective halves of the CW probe signal propagate in clockwise and counter-clockwise directions. A band pass filter BPF 24 connected to the last port of the coupler 23 is used to select the output signal which is regenerated and is of wavelength $\lambda_p$. The BPF 24 has a passband characteristic which is selected to allow radiation of wavelength $\lambda_p$ to pass and to block radiation at other wavelengths, in particular at wavelength $\lambda_s$ corresponding to the input signals. In general, the pump signal (produced by the sum of signals A and B) and the probe signal should be aligned in order to maximize the phase shift. In this case, the reduction of the XPM efficiency due to the use of two orthogonal pump components, can be compensated for by an appropriate adjustment of the polarization controller 19 in the loop. In each arrangement the polarization controller 19, which is of known construction, is based on a multiple fibre loop arrangement.

In order to completely exploit the non-linear characteristics shown in FIGS. 3 and 4, it is found that a total peak pump power of 33 dBm is needed. This corresponds to a mean power of 30 dBm if a NRZ (Non Return to Zero) pseudo-random bit pattern is considered for both the signals A and B. In this case, a special bit scheme can be used with a reduced number of ones compared with the zeroes in order to have high peak power against maximum total (A and B) mean pump power of 27 dBm. The use of longer sections of DS fibre can reduce the required peak power. As an alternative Highly Non-linear Fibres (HNLF) with a non-linear coefficient of order 1000 $km^{-1}watt^{-1}$ can be used to reduce the length of fibre required and make the gate more compact. For example, used of HNLF requires a fibre loop of only a few meters (1-2 m) as compared to 1 km when using DSF.

Figure 7:
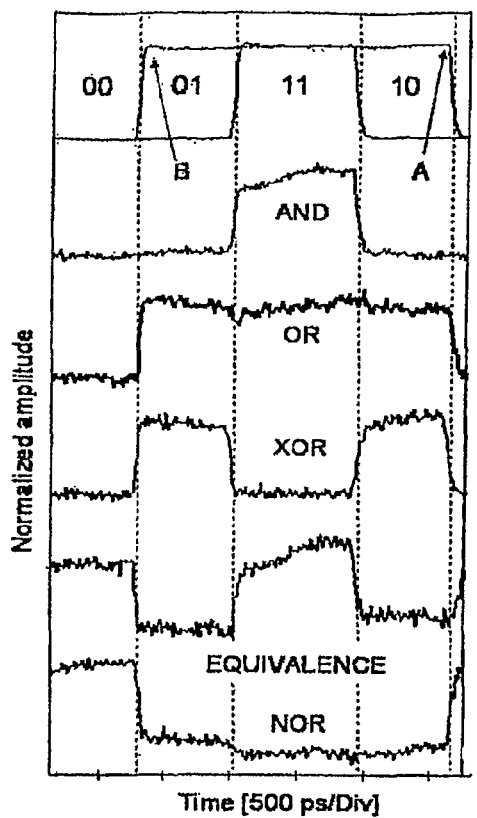
FIG. 7 illustrates the correlation between two Non Return to Zero (NRZ) signals input to AND, OR, XOR, EQ, NOR logic gates in accordance with the invention and the corresponding wave forms output.
Figure 8:
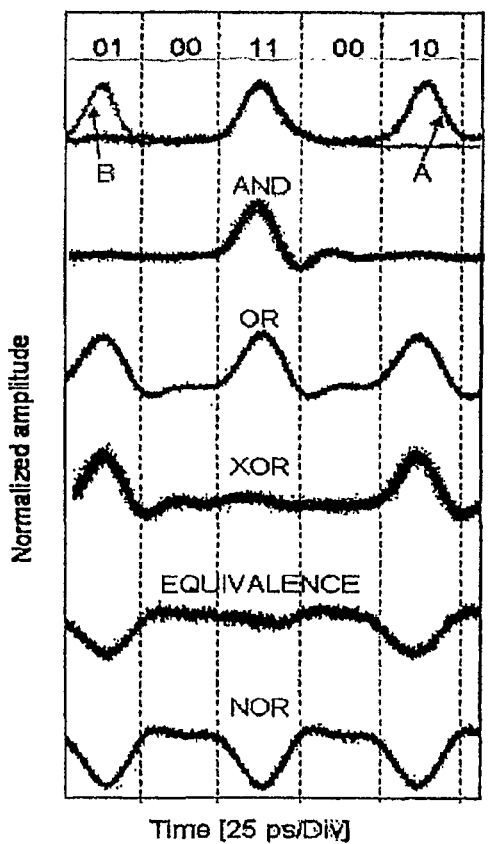
FIG. 8 illustrates the correlation between two Return to Zero (NRZ) signals input to AND, OR, XOR, EQ, NOR logic gates in accordance with the invention and the corresponding wave forms output.

FIGS. 7 and 8 show the measured response for optical gates in accordance with the invention. The responses are normalized amplitude versus time and show the input signals A and B (top) and the corresponding normalized outputs (bottom) for the various logic operation of the gate. FIG. 7 are responses for NRZ input signals and FIG. 8 ultra short RZ (Return to Zero) signals. Each of the responses was measured with a 50 GHz digital oscilloscope.

In FIGS. 7 and 8 all four possible input combinations (AB=00, 01, 11 and 10) are illustrated. The use of both the modulation formats of the input signals, allows the effectiveness of a non-PM loop to compensate for undesirable effects in the NOLM caused by the counter propagating signals to be evaluated. Indeed, these effects become considerable if A and B are NRZ signals or if they are high bit rate pulse trains. Moreover, the 15 ps RZ signals which were used for testing confirm the suitability of the optical gates of the invention in ultra-fast applications. The curves in FIGS. 7 and 8 verify the correct behaviour of all logic gates and the measured values of the on-off contrast ratio confirm the results shown in FIGS. 3 and 4. In the case of AND, XOR and OR, an improvement of 3 dB was measured with respect to the 17 dB input on-off contrast ration. This improvement is due to the ability of the SPM-based NOLM to act as a pedestal suppressor.

Moreover, considering an input Q-factor of 5 for both the signals A and B, an increase of the output Q-factor of between 1 and 2 was measured for all the logic gates except the EQUIVALENCE gate which showed a decrease of 1. The Q-factor decrease due to the pedestal output signal can be avoided by inserting a pedestal optical suppressor stage 25 (indicated generically by PS in FIG. 6) on the output of the non-linear device. The suppressor can be advantageously realized by means of another SPM-based NOLM.

Finally, the fast response time of the Kerr effects like SPM and XPM in the optical fibre allow all-optical logic gates implemented in accordance with the invention to be suitable in applications operating at 160 Gbit/s and higher.

It is now clear that the predetermined purposes of the present invention have been achieved by making available a simple and efficient all-optical logic gate. Thanks to the principles of the present invention it is possible to obtain in the optical domain all the logic functions (NOT, AND, OR XOR, EQUIVALENCE, NOR, NAND). If the non-linear block is then implemented through NOLM by utilizing self-phase modulation (SPM) or cross-phase modulation (XPM), ultra fast logic gates are obtained that are also re-configurable and regenerative. The effectiveness of such logic gates has been verified both for NRZ signals and for RZ signals.

It will be appreciated that variations can be made that are within the scope of the invention. For example, whilst the use of an NOLM as the non-linear block is particularly preferred due to the extremely fast response time which enables gates to be implemented that are capable of operation at 160 Gbit/s and higher, other non-linear optical devices can be used. For example in other implementations it is envisaged to use semiconductor optical devices such as a semiconductor amplifier in an interferometric structure.

The invention claimed is:

1. An optical logic gate comprising:
   first and second optical input ports configured to receive respective optical signals (A, B);
   an optical output port configured to output an optical signal ($P_{out}$);
   an optical combiner configured to combine the optical signals (A, B) to produce a combination signal having a power ($P_i$) that is the combination of the powers ($P_A$, $P_B$) of the optical signals (A, B);
   a non-linear optical device configured to receive the combination signal from the optical combiner, and to output the optical signal ($P_{out}$) from the optical output port based on a characteristic of the non-linear optical device such that the optical signal ($P_{out}$) represents the result of a logic function applied to the optical signals (A, B);
   a logic selector configured to select the characteristic of the non-linear optical device such that the logic function correlates the power of the output signal ($P_{out}$) to the power of the combination signal ($P_i$); and
   the logic selector comprising a polarization controller in a fiber loop of the non-linear optical device, the polarization controller configured to alter the characteristic of the non-linear optical device to select the logic function.

2. The optical gate of claim 1 wherein the non-linear optical device comprises a non-linear optical loop mirror (NOLM).

3. The optical logic gate of claim 1 wherein the optical combiner comprises a Polarization Beam Combiner (PBC).

4. The optical logic gate of claim 1 wherein the non-linear optical device comprises a Self Phase Modulation (SPM)-based non-linear optical device, and is configured to split the combination signal to counter-propagate around a fiber loop.

5. The optical logic gate of claim 1 wherein the non-linear optical device comprises a Cross Phase Modulation (XPM)-based non-linear optical device, and wherein the combination signal comprises an optical pump signal.

6. The optical logic gate of claim 5 further comprising an optical coupler/splitter connected to a fiber loop and configured to couple a continuous wave (CW) optical probe signal into the fiber loop.

7. The optical logic gate of claim 1 further comprising an optical pedestal suppressor connected to the output of the non-linear optical device.

8. The optical logic gate of claim 1 wherein the optical signals (A, B) comprise signals having the same carrier wavelength ($\lambda$s).

9. The optical logic gate of claim 1 wherein optical combiner is configured to combine the optical signals (A, B) with orthogonal states of polarization.

10. The optical logic gate of claim 1 further comprising an adjustable optical attenuator disposed between the optical input ports and the optical combiner.

11. The optical logic gate of claim 1 further comprising an optical amplifier configured to amplify the combination signal prior to being received by the non-linear optical device.

12. The optical logic gate of claim 1 wherein the logic function is selected from the group consisting of AND, OR, XOR, EQUIVALENCE, NOR, and NAND.

13. An optical logic gate comprising:
    first and second optical input ports configured to receive respective optical signals (A, B);
    an optical output port configured to output an optical signal ($P_{out}$;
    an optical combiner configured to combine the optical signals (A, B) to produce a combination signal comprising an optical pump signal having a power ($P_i$) that is the combination of the powers ($P_A$, $P_B$) of the optical signals (A, B);
    a non-linear optical device comprising a Cross Phase Modulation (XPM)-based non-linear optical device, and configured to receive the combination signal from the optical combiner, and to output the optical signal ($P_{out}$) from the optical output port based on a characteristic of the non-linear optical device such that the optical signal ($P_{out}$) represents the result of a logic function applied to the optical signals (A, B);
    a logic selector configured to select the characteristic of the non-linear optical device such that the logic function correlates the power of the output signal ($P_{out}$) to the power of the combination signal ($P_i$); and
    an optical coupler/splitter connected to a fiber loop and configured to couple a continuous wave (CW) optical probe signal into the fiber loop.

* * * * *

UNITED STATES PATENT AND TRADEMARK OFFICE
CERTIFICATE OF CORRECTION

PATENT NO. : 7,925,131 B2  Page 1 of 1
APPLICATION NO. : 11/570985
DATED : April 12, 2011
INVENTOR(S) : Bogoni et al.

It is certified that error appears in the above-identified patent and that said Letters Patent is hereby corrected as shown below:

In Column 3, Line 27, delete "$P_i$" and insert -- $P_1$ --, therefor.

In Column 3, Line 32, delete "$P_{in}$-$P_1$" and insert -- $P_{in}$=$P_1$ --, therefor.

In Column 3, Line 33, delete "$P_{in}$-$P_h$," and insert -- $P_{in}$=$P_h$ --, therefor.

In Column 4, Line 15, delete "CC)" and insert -- (PC) --, therefor.

In Column 4, Line 28, delete "$P_{in}$3 W" and insert -- $P_{in}$=3 W --, therefor.

In Column 7, Line 30, in Claim 2, delete "optical gate" and
insert -- optical logic gate --, therefor.

In Column 8, Line 23, in Claim 13, delete "($P_{out}$;" and insert -- ($P_{out}$); --, therefor.

Signed and Sealed this
Eleventh Day of October, 2011

David J. Kappos
*Director of the United States Patent and Trademark Office*